(12) United States Patent
Takenaka

(10) Patent No.: US 12,194,692 B2
(45) Date of Patent: Jan. 14, 2025

(54) FIBER ARRANGING DEVICE, METHOD OF ARRANGING FIBERS AND METHOD OF MOLDING COMPOSITE MATERIAL

(71) Applicant: SUBARU CORPORATION, Tokyo (JP)

(72) Inventor: Suguru Takenaka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 42 days.

(21) Appl. No.: 18/067,325

(22) Filed: Dec. 16, 2022

(65) Prior Publication Data
US 2023/0226781 A1    Jul. 20, 2023

(30) Foreign Application Priority Data

Jan. 20, 2022   (JP) ................................ 2022-007499

(51) Int. Cl.
*B29C 70/38*         (2006.01)
(52) U.S. Cl.
CPC .................................. *B29C 70/388* (2013.01)
(58) Field of Classification Search
CPC ... B29C 70/384; B29C 70/386; B29C 70/388; B29C 70/504; B29C 43/46
See application file for complete search history.

(56) References Cited

U.S. PATENT DOCUMENTS

| | | | | |
|---|---|---|---|---|
| 4,877,471 A | * | 10/1989 | McCowin | B29C 53/8016 156/181 |
| 5,290,389 A | * | 3/1994 | Shupe | B29C 70/384 156/425 |
| 5,700,347 A | * | 12/1997 | McCowin | B29C 70/545 156/499 |
| 6,544,367 B1 | * | 4/2003 | Fujimoto | B65H 35/0013 156/425 |

(Continued)

FOREIGN PATENT DOCUMENTS

| | | |
|---|---|---|
| JP | H01-247146 | 10/1989 |
| JP | 2004-181683 A | 7/2004 |

(Continued)

OTHER PUBLICATIONS

Extended European Search Report mailed Jul. 6, 2023 in European Patent Application No. 22214126.9 (6 pages).

*Primary Examiner* — Matthew J Daniels
(74) *Attorney, Agent, or Firm* — Smith, Gambrell & Russell, LLP

(57) ABSTRACT

A fiber arranging device includes first guides, a first moving mechanism, second guides, a second moving mechanism and a roller. The first guides guide a first feeding of first tapes in a first feeding direction. The first tapes are first fibers or prepregs. The first moving mechanism changes an interval between the first guides, for the first feeding of the first tapes with a first interval. The second guides guide a second feeding of second tapes in a second feeding direction. The second tapes are second fibers or prepregs. The second (Continued)

moving mechanism changes an interval between the second guides, for the second feeding of the second tapes with a second interval. The roller feeds the first tapes and the second tapes in a same feeding direction by disposing the first tapes and the second tapes alternately.

9 Claims, 8 Drawing Sheets

(56) References Cited

U.S. PATENT DOCUMENTS

| | | | |
|---|---|---|---|
| 6,585,842 B1* | 7/2003 | Bompard | B29C 70/202 |
| | | | 156/273.1 |
| 8,986,482 B2 | 3/2015 | McCowin et al. | |
| 2008/0282863 A1* | 11/2008 | McCowin | B29C 70/545 |
| | | | 83/13 |
| 2008/0295954 A1* | 12/2008 | Kisch | B29C 70/384 |
| | | | 156/543 |
| 2013/0074663 A1* | 3/2013 | Pedigo | B29C 70/384 |
| | | | 83/13 |
| 2014/0259630 A1* | 9/2014 | Johnson | B29C 70/388 |
| | | | 83/438 |
| 2021/0206122 A1* | 7/2021 | Kawabe | B29C 70/545 |

FOREIGN PATENT DOCUMENTS

| | | |
|---|---|---|
| JP | 2011-527648 A | 11/2011 |
| JP | 2020-059145 A | 4/2020 |
| WO | 2019/122431 A1 | 6/2019 |

* cited by examiner

FIBER ARRANGING DEVICE, METHOD OF ARRANGING FIBERS AND METHOD OF MOLDING COMPOSITE MATERIAL

CROSS REFERENCES TO RELATED APPLICATIONS

This application is based upon and claims the benefit of priority from Japanese Patent Application No. 2022-007499, filed on Jan. 20, 2022; the entire contents of which are incorporated herein by reference.

FIELD

Implementations described herein relate generally to a fiber arranging device, a method of arranging fibers, and a method of molding a composite material.

BACKGROUND

In order to mold an FRP (fiber reinforced plastic), such as a GFRP (glass fiber reinforced plastic) or a CFRP (carbon fiber reinforced plastic), which is also referred to as a composite material, it is necessary to laminate prepreg sheets consisting of fiber sheets impregnated with uncured resin, and subsequently cure the resin. Alternatively, it is necessary to laminate fiber sheets which have not been impregnated with resin, and subsequently impregnate the laminated fiber sheets with the resin and cure the resin. The method of molding an FRP of impregnating fibers with resin after laminating the fibers is referred to as an RTM (Resin Transfer Molding) method.

In recent years, an AFP (Automated Fiber Placement) apparatus for automatically laminating prepreg tapes or fiber tapes is commercially available, and therefore a prepreg tape as well as a fiber tape, which has not been impregnated with resin, called a dry tape is also commercially available for lamination with an AFP apparatus (for example, refer to Japanese Patent Application Publication JPH01-247146A, Japanese Patent Application Publication JP2004-181683A, and Japanese Patent Application Publication JP2011-527648A).

When tape materials, such as prepreg tapes or dry tapes, are laminated with an AFP apparatus, laminating the tape materials simultaneously can improve the lamination efficiency, i.e., the length of the tape material laminated per unit time. Accordingly, an AFP apparatus having lamination heads is also devised so that tape materials can be laminated simultaneously. In addition, technique for adjusting an overlapped amount between adjacent prepreg tapes is also suggested for a multi-head type AFP apparatus for laminating prepreg tapes simultaneously (for example, refer to Japanese Patent Application Publication JP2020-059145A).

However, the conventional AFP apparatus having lamination heads can laminate only tape materials each having a specific width. Therefore, in order to change the total width of laminated tape materials, the overlapped amounts among the tape materials have to be changed. In other words, the total width of laminated tape materials cannot be changed unless the tape materials are partially overlapped with each other. Accordingly, the thickness of laminated tape materials cannot be made uniform.

In addition, when prepreg tapes are overlapped with each other to be laminated, it may become difficult to laminate the prepreg tapes along a curved line since each prepreg tape has the viscosity. Specifically, when prepreg tapes are tried to be laminated along a curved line with overlapping the prepreg tapes with each other, the prepreg tapes may not be laid ideally since the length of a prepreg tape laminated on the inner side differs from that on the outer side. Accordingly, when prepreg tapes are overlapped with each other to be laminated, the prepreg tapes have to be laminated linearly or along a curved line whose curvature is very small.

This applies to a case where the width of the tape material itself is large. That is, in order to laminate tape materials along a curved line whose curvature is large, it is necessary to laminate tape materials whose widths are narrow without overlapping the tape materials with each other. The narrower the widths of tape materials are, the more the lamination efficiency of the tape materials decreases. Therefore, in order to avoid or reduce a decrease in the lamination efficiency, laminating more tape materials simultaneously is required.

However, a typical AFP apparatus has a lamination head composed of a brake for fixing a tape material, a feed roller for feeding out a tape material, a cutter for cutting a tape material, and a compaction roller for pushing a tape material on a mold. The widths of these components of the lamination head are each larger than the width of a tape material. Accordingly, lamination heads cannot be arrayed in the width direction of tape materials in order to avoid interference among the components. That is, lamination heads whose number is the same as that of tape materials have to be arranged at positions different from each other in the feeding direction of the tape materials like arranging the lamination heads alternately. As a result, feeding many tape materials simultaneously requires a large-scale AFP apparatus having many lamination heads, and therefore it is not easy to increase the number of tape materials.

Accordingly, an object of the present invention is to allow laminating tape materials, such as prepreg tapes or dry tapes, used as material of an FRP simultaneously without overlapping the tape materials with each other as well as to allow changing the total width of laminated tape materials.

Moreover, another object of the present invention is to allow laminating more tape materials by an AFP apparatus without a complicated and large-scale lamination head.

SUMMARY OF THE INVENTION

In general, according to one implementation, a fiber arranging device includes first guides, a first moving mechanism, second guides, a second moving mechanism and a roller. The first guides guide a first feeding of first tapes in a first feeding direction. The first tapes are first fibers or prepregs. The first moving mechanism is configured to change an interval between the first guides, for the first feeding of the first tapes with a first interval. The second guides guide a second feeding of second tapes in a second feeding direction. The second tapes are second fibers or prepregs. The second feeding direction differs from the first feeding direction. The second moving mechanism is configured to change an interval between the second guides, for the second feeding of the second tapes with a second interval. The roller feeds, in a same feeding direction, the first tapes fed with the first interval from the first guides and the second tapes fed with the second interval from the second guides. The roller disposes the first tapes and the second tapes alternately.

Further, according to one implementation, a method of arranging fibers includes producing arrayed tapes by the above-mentioned fiber arranging device. The arrayed tapes include the first tapes having the first interval and the second tapes having the second interval. The arrayed tapes have no adjacent tapes overlapped with each other in a width direction.

Further, according to one implementation, a method of molding a composite material includes: producing a laminated body of the arrayed tapes by laminating the arrayed tapes produced by the above-mentioned method; and molding the composite material using the laminated body.

DETAILED DESCRIPTION

A fiber arranging device, a method of arranging fibers, and a method of molding a composite material according to implementations of the present invention will be described with reference to the accompanying drawings.
(First Implementation)
(Structure and Function of a Fiber Arranging Device)

Figure 1:
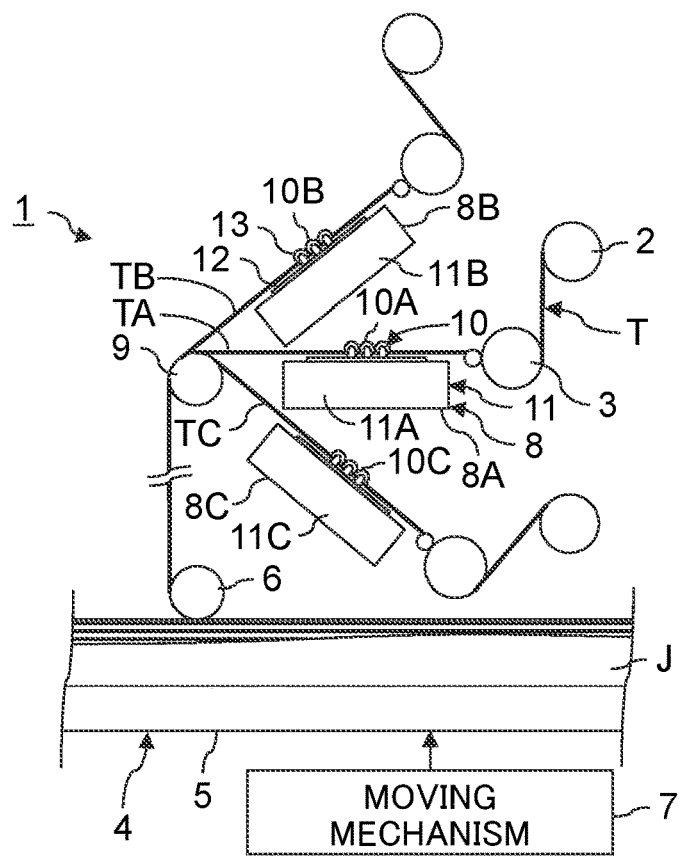
FIG. 1 is a front view showing the structure of a fiber arranging device according to the first implementation of the present invention.
Figure 2:
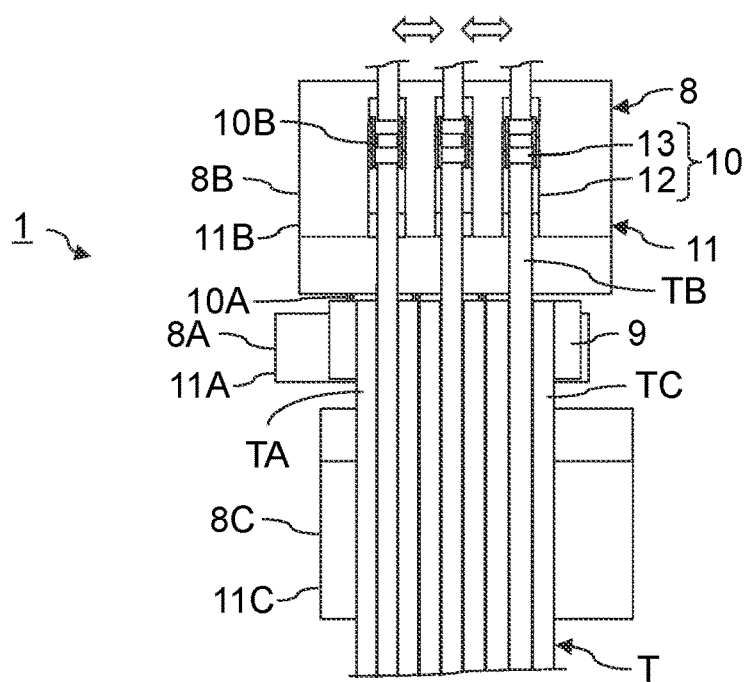
FIG. 2 is a left side view of the fiber arranging device shown in FIG. 1.

FIG. 1 is a front view showing the structure of a fiber arranging device according to the first implementation of the present invention, and FIG. 2 is a left side view of the fiber arranging device shown in FIG. 1.

A fiber arranging device 1 feeds out tapes T, which are material of an FRP, in a same direction in a state where the tapes T have been arrayed without overlapping the tapes T with each other so that the tapes T can be laminated simultaneously. In other words, the fiber arranging device 1 arrays tapes T supplied from different directions so that the length directions of the tapes T may become almost parallel, and sends out the arrayed tapes T without overlapping the tapes T with each other.

When a clearance gap may be formed between adjacent laminated tapes T, i.e., the width of an area in which the tapes T are laminated is wider than the sum total of the widths of the tapes T to be arrayed, the fiber arranging device 1 may array the tapes T with a clearance gap between adjacent tapes T. Hereinafter, a case of arraying the tapes T without a clearance gap and overlap unless extents of the clearance gap and overlap are negligible errors will be described as an example.

Each tape T to be arrayed is a prepreg tape or a dry tape. A prepreg tape is prepreg, consisting of fibers impregnated with resin, in the form of a tape. A dry tape is fibers, which have not been impregnated with resin, in the form of a tape.

Figure 3:
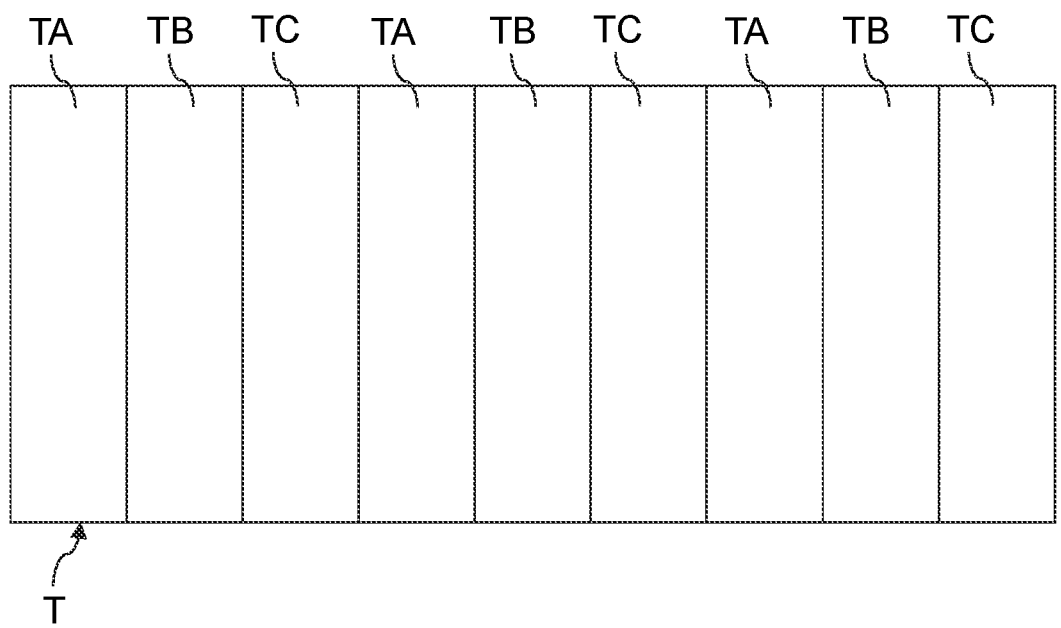
FIG. 3 shows an example of the arrayed tapes fed out from the fiber arranging device shown in FIG. 1.
Figure 4:
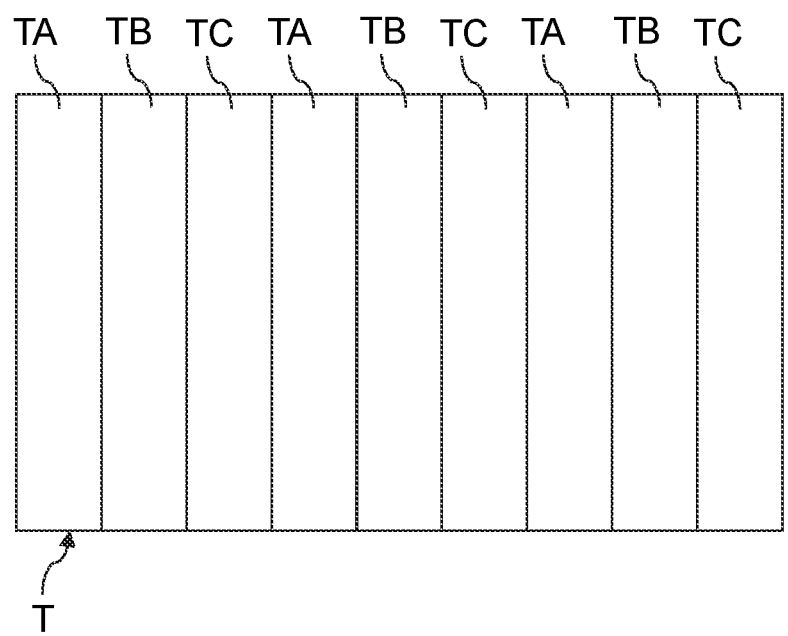
FIG. 4 shows an example of the arrayed tapes fed out from the fiber arranging device shown in FIG. 1.

FIG. 3 and FIG. 4 each shows an example of the arrayed tapes T fed out from the fiber arranging device 1 shown in FIG. 1.

The tapes T having different widths can be supplied to the fiber arranging device 1. Therefore, when the tapes T having wide widths are supplied to the fiber arranging device 1, the width of the arrayed tapes T fed out from the fiber arranging device 1 also becomes wide as exemplified by FIG. 3. Meanwhile, when the tapes T having narrow widths are supplied to the fiber arranging device 1, the width of the arrayed tapes T fed out from the fiber arranging device 1 also becomes narrow as exemplified by FIG. 4.

When the width of each tape T is made large as exemplified by FIG. 3, an area of the tapes T which can be laminated per unit time can be enlarged. Conversely, when the width of each tape T is made small as exemplified by FIG. 4, each tape T can be laminated along a curved line whose curvature is large. Therefore, according to a form of an FRP to be mold, the tapes T having appropriate widths can be supplied to the fiber arranging device 1 while the tapes T can be disposed so that the sum of the widths of the tapes T may become appropriate.

Supplying devices of the tapes T each disposed in the fore stage of the fiber arranging device 1 may be bobbins 2 themselves of the tapes T each having a constant width. Alternatively, a width adjusting device 3 for changing the width of the tape T may be disposed between each of the bobbins 2 of the tapes T and the fiber arranging device 1, as needed, as exemplified by FIG. 1. The width adjusting device 3 may have desired structure as long as the width of the tape T can be changed.

As an example of a device for expanding the width of a dry tape, an opening apparatus disclosed by the pamphlet of the international publication No. 2010/137525 is known. In addition, a device, which can narrow the width of not only a dry tape but a prepreg tape, disclosed by Japanese Patent Application Publication JP2020-93454A may be used as the width adjusting device 3.

When the width adjusting devices 3 are disposed, the widths of the tapes T supplied from the bobbins 2 can be changed into desired widths respectively to be supplied to the fiber arranging device 1. Conversely, also when the width adjusting devices 3 are not disposed, the tapes T having different widths can be supplied to the fiber arranging device 1 by exchanging the bobbins 2 for other bobbins 2 of the tapes having the different widths.

An AFP apparatus 4 is disposed in the rear stage of the fiber arranging device 1. In other words, the fiber arranging device 1 may be an attachment of the AFP apparatus 4 or a part of components included in the AFP apparatus 4, for supplying the arrayed tapes T to the AFP apparatus 4. The typical AFP apparatus 4 includes a table 5 for laminating the tapes T, a compaction roller 6 for pushing the tapes T towards the table 5, and a moving mechanism 7 for moving the compaction roller 6 relatively to the table 5. When the lower surface of the tapes T is not flat, a jig J, such as a lower mold, may be placed on the table 5 so that the tapes T can be laminated on the jig J, as exemplified by FIG. 1.

When the compaction roller 6 is moved relatively to the table 5 in a state where the arrayed tapes T have been pushed on the table 5 side by the compaction roller 6, the arrayed tapes T can be fed out in a direction opposite to the moving direction of the compaction roller 6 while giving tension to the tapes T. That is, once the ends of the tapes T have reached the compaction roller 6, the tapes T can be fed out without giving tension to the arrayed tapes T or the tapes, which have not been arrayed, by a roller or rollers having power. Therefore, it is not essential to include a power source for feeding out the tapes T in the fiber arranging device 1 disposed in the fore stage of the AFP apparatus 4.

On the contrary, the compaction roller 6 cannot give tension to the tapes T until the ends of the tapes T reach the compaction roller 6. Accordingly, at least one roller which rotates by power of a motor may be disposed at a desired position so that the tapes T can be fed out while applying tension to the tapes T. The typical AFP apparatus 4 includes at least one roller, which is called a feed roller and has power, for feeding out the tapes T while giving tension to the tapes T as well as at least one brake for stopping the feeding of the tapes T and a cutter for cutting the tapes T.

Also when sufficient tension cannot be given to the tapes T only by the compaction roller 6, at least one roller which rotates by power of a motor may be disposed at a desired position so that additional tension can be given to the tapes T. Therefore, a power source, such as a motor, and at least one roller rotating by power of the power source for feeding out the tapes T may be included also in the fiber arranging device 1 disposed in the fore stage of the AFP apparatus 4, as needed.

When the AFP apparatus 4 having configuration as described above is used, the tapes T arrayed by the fiber arranging device 1 as exemplified by FIG. 3 or FIG. 4 can be laminated on the table 5. Although FIG. 1 shows an example of configuration that the table 5 is moved along desired driving axes by the moving mechanism 7, a gantry holding the compaction roller 6 may be moved by the moving mechanism 7. Moreover, it is practical to allow not only linear movement in orthogonal three axis directions but rotational movement from a viewpoint of allowing molding an FRP having a more complicated form.

The fiber arranging device 1 includes tape feeders 8 and an assembling roller 9. Each of the tape feeders 8 adjusts intervals between the tapes T, and feeds out the tapes T in a same feeding direction, i.e, feeds out the tapes T so that the length directions of the tapes T may become almost parallel to each other. In order to avoid interference among the tape feeders 8, the feeding directions of the tapes T differ from each other among the tape feeders 8. The assembling roller 9 is a cylindrical or columnar roller for alternately arraying the tapes T respectively fed out from the tape feeders 8 in the different directions, and feeding out the arrayed tapes T in a same feeding direction.

The number of the tape feeders 8 and the number of the tapes T to be fed out from each tape feeder 8 are determined according to the number of the tapes T to be arrayed by the fiber arranging device 1. That is, the number of the tape feeders 8 and the number of the tapes T to be fed out from each tape feeder 8 are determined so that the total number of the tapes T fed out from all the tape feeders 8 may be same as the number of the tapes T to be fed out from the fiber arranging device 1 to the AFP apparatus 4.

Note that, the total number of the tapes T to be fed out from the fiber arranging device 1 to the AFP apparatus 4 may be made alterable by stopping a part of the tape feeders 8 or reducing the number of the tapes T to be fed out from the same tape feeder 8. In that case, the number of the tape feeders 8 and the number of the tapes T to be fed out from each tape feeder 8 are determined according to the maximum of the total number of the tapes T which may be fed out from the fiber arranging device 1 to the AFP apparatus 4. At least one of the number of the tape feeders 8 and the number of the tapes T to be fed out from each tape feeder 8 may be also variable in the fiber arranging device 1. In that case, the maximum itself of the total number of the tapes T which can be fed out from the fiber arranging device 1 to the AFP apparatus 4 can be changed.

Each of the tape feeders 8 has tape feeding guides 10 and a guide moving mechanism 11. Each of the tape feeding guides 10 is a device for guiding the feeding of the tape T, made of fibers or prepreg, in the feeding direction. Accordingly, the number of the tape feeding guides 10 is equal to the number of the tapes T to be fed out from each tape feeder 8.

For example, the tape feeding guide 10 can be composed of a pedestal 12 and rollers 13 fixed to the pedestal 12 as exemplified by FIG. 1 so that the travelling direction of the tape T can be restricted while keeping the tension of the tape T. In that case, the number of the rollers 13 is determined to be appropriate for keeping the tension of the tape T. As a matter of course, the tape feeding guide 10 can be composed of desired elements, such as a belt conveyor of which a belt is supported and moved with the pulleys, as long as the travelling direction of the tape T can be restricted while keeping the tension of the tape T.

The tapes T which should be adjacently disposed without overlapping the tapes T with each other are fed out from the different tape feeders 8. Accordingly, the tapes T fed out from each tape feeder 8 have to have intervals for disposing the tapes T fed out from the other tape feeders 8.

Conversely, when the tapes T which should be adjacently disposed without overlapping the tapes T with each other are fed out from the different tape feeders 8 while intervals are formed among the tapes T fed out from each tape feeder 8, interference among the tape feeding guides 10 can be avoided without complicating the structure of each tape feeding guide 10. Accordingly, the tape feeding guides 10 for feeding out the tapes T adjacently disposed with intervals in the same tape feeder 8 can be adjacently disposed with intervals corresponding to the intervals of the tapes T.

When the tape T to be guided by each tape feeding guide 10 does not have a specific width, i.e., when the tapes T having different widths have to be guided by each tape feeding guide 10, the intervals of the tapes T fed out from the same tape feeder 8 have to be changed according to the width of each tape T. Therefore, the intervals of the tape feeding guides 10 adjacently disposed in the same tape feeder 8 also have to be changed according to the width of each tape T.

Even when the width of the tape T to be guided by each tape feeding guide 10 is constant, a part of the tape feeders 8 may be stopped, or conversely, the number of the tape feeders 8 may be increased. Therefore, the number of the alternately disposed tapes T may be changed. Thus, the intervals of the tapes T fed out from the same tape feeder 8 and the intervals of the tape feeding guides 10 included in the same tape feeder 8 have to be changed according to the number of the tape feeders 8 and the tapes T.

Accordingly, the intervals of the tape feeding guides 10 adjacently disposed in the same tape feeder 8 can be changed by the guide moving mechanism 11. That is, the guide moving mechanism 11 adjusts the intervals of the tape feeding guides 10 adjacently disposed in the same tape feeder 8 to appropriate intervals according to at least one of the widths of the tapes T and the number of the tapes T.

More specifically, the interval between each two tape feeding guides 10 adjacently disposed in the same tape feeder 8 is adjusted by the guide moving mechanism 11 so that an interval necessary to dispose at least one tape T fed out from the different tape feeder 8 or the different tape feeders 8 without overlapping the at least one tape T in the width direction may arise between each two tapes T to be adjacently fed out from the same tape feeder 8.

In the illustrated example, the fiber arranging device 1 includes the three tape feeders 8 consisting of the first to the third tape feeders 8A, 8B, and 8C so that the three tapes TA, TB, or TC can be fed out from each of the tape feeders 8A, 8B, and 8C. Therefore, the total of the nine tapes TA, TB, and TC can be arrayed and fed out.

More specifically, the feeding of the first tapes TA in the first feeding direction is guided by the first tape feeding guides 10A included in the first tape feeder 8A. Meanwhile, the first guide moving mechanism 11A included in the first tape feeder 8A is configured to change the intervals of the first tape feeding guides 10A so that the first tapes TA may be fed out with the first intervals in the first feeding direction.

Similarly, the feeding of the second tapes TB in the second feeding direction different from the first feeding direction is guided by the second tape feeding guides 10B included in the second tape feeder 8B. Meanwhile, the second guide moving mechanism 11B included in the second tape feeder 8B is configured to change the intervals of the second tape feeding guides 10B so that the second tapes TB may be fed out with the second intervals in the second feeding direction.

Similarly, the feeding of the third tapes TC in the third feeding direction different from any of the first feeding direction and the second feeding direction is guided by the third tape feeding guides 10C included in the third tape feeder 8C. Meanwhile, the third guide moving mechanism 11C included in the third tape feeder 8C is configured to change the intervals of the third tape feeding guides 10C so that the third tapes TC may be fed out with the third intervals in the third feeding direction.

When the tapes TA, TB, and TC fed out from the three tape feeders 8A, 8B, and 8C respectively are disposed alternately by the assembling roller 9, the interval between each two tapes T fed out from each of the first to third tape feeders 8 is used for disposing two tapes T respectively fed out from the other two tape feeders 8. Therefore, the intervals of the tape feeding guides 10 included in each of the tape feeders 8 are adjusted by the guide moving mechanism 11 so that the interval between each two tapes T fed out from the tape feeding guides 10 may become the sum total of the widths of the two tapes T respectively fed out from the other two tape feeders 8.

The widths of the tapes supplied to the tape feeders 8 and fed out from the tape feeders 8 respectively may not necessarily be the same among the tape feeders 8. Therefore, when the widths of the tapes T fed out differ among the tape feeders 8, the intervals of the tape feeding guides 10 are adjusted to intervals different among the tape feeders 8.

For example, when the tapes TA, TB, and TC are fed out by the first to third tape feeders 8A, 8B, and 8C respectively as illustrated, the first intervals of the first tapes TA fed out in the first feeding direction, the second intervals of the second tapes TB fed out in the second feeding direction, and the third intervals of the third tapes TC fed out in the third feeding direction are not necessarily the same.

On the other hand, when the widths of the tapes T fed out from the tape feeders 8 are the same, the intervals among the tape feeding guides 10 are also adjusted to be the same among the tape feeders 8. For example, when the tapes TA, TB, and TC are fed out by the first to third tape feeders 8A, 8B, and 8C respectively as illustrated, the first intervals of the first tapes TA fed out in the first feeding direction, the second intervals of the second tapes TB fed out in the second feeding direction, and the third intervals of the third tapes TC fed out in the third feeding direction are adjusted to be the same.

Note that, each figure shows a case where the widths of the tapes T fed out from the tape feeders 8 are the same. Hereinafter, a case where the widths of the tapes T fed out from the tape feeders 8 are the same among the tape feeders 8 will be described as an example, for simplifying explanation.

As mentioned above, the number of the tape feeders 8 and the number of the tapes T to be fed out from each tape feeder 8 can be determined freely according to the total number of the tapes T which could be fed out from the fiber arranging device 1 to the AFP apparatus 4. Therefore, the fiber arranging device 1 has at least two tape feeders 8, and more than three tape feeders 8 may be disposed so that the tapes T may not interfere with each other, regardless of the illustrated example.

Moreover, each tape feeder 8 is configured to feed out at least two tapes, and more than three tapes T may be fed out from each tape feeder 8 regardless of the illustrated example. When each tape feeder 8 is configured to feed out three tapes T as illustrated, the structure of the guide moving mechanism 11 can be simplified as an example described later.

The tape feeders 8 and the assembling roller 9 disposed in the rear stage of the tape feeders 8 are relatively disposed so that the tapes T fed out from the tape feeding guides 10 included in the different tape feeders 8, with predetermined intervals in different feeding directions may reach the assembling roller 9 without interference, and may be arrayed alternately on the assembling roller 9 without overlapping the tapes T with each other. For that purpose, it is necessary to relatively dispose the tape feeders 8 and the assembling roller 9 so that the thickness directions of the tapes T fed out from the different tape feeders 8 may lie on a same plane and become almost perpendicular to the rotating shaft of the assembling roller 9 at least just before the assembling roller 9.

For example, the thickness directions of the tapes TA, TB, and TC respectively fed out from the first to the third tape feeders 8A, 8B, and 8C lie on a same plane and are perpendicular to the rotating shaft of the assembling roller 9, in the example shown in FIG. 1. In order to avoid interference among the tape feeders 8, the thickness directions of the tapes T fed out from a part or all of the tape feeders 8 may be changed by rollers whose directions of the rotating shafts are different, or the like so that the thickness directions of the tapes T fed out from all the tape feeders 8 may eventually become almost perpendicular to the rotating shaft of the assembling roller 9 just before the assembling roller 9. At least one of the thickness directions of the tapes T may not be made strictly perpendicular to the rotating shaft of the assembling roller 9 but be slightly slanted to the rotating shaft of the assembling roller 9. In this case, the feeding directions of the arrayed tapes T may be finely adjusted.

As long as all the tapes T can be fed out from the tape feeders 8 to appropriate positions on the assembling roller 9 in appropriate directions, the alternately arrayed tapes T can be fed out in a same feeding direction. That is, the tapes T arrayed so that each tapes T adjacent to each other in the width direction may not overlap with each other in the width direction can be produced by the fiber arranging device 1 and supplied to the AFP apparatus 4, as material of an FRP.

Next, an example of concrete structure of the guide moving mechanism 11 included in each of the tape feeders 8 will be described.

Figure 5:
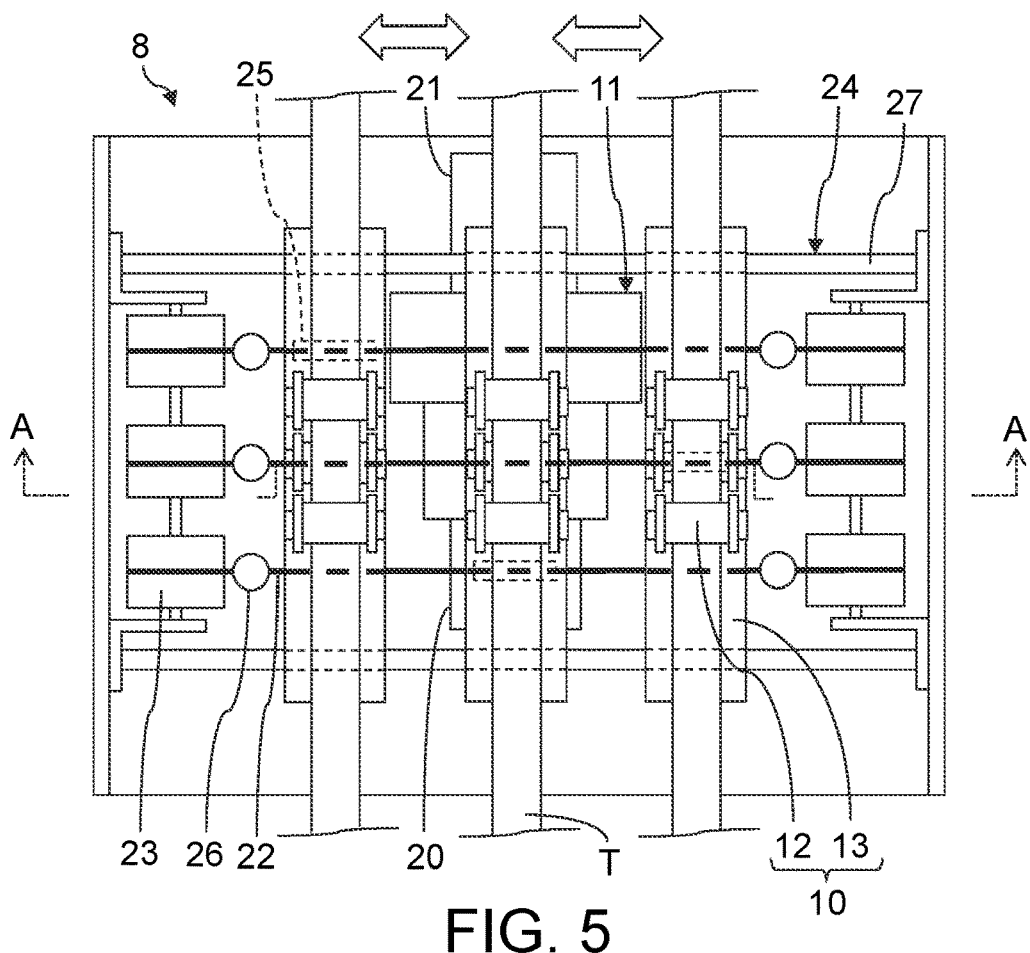
FIG. 5 is a top view showing an example of concrete structure of each tape feeder shown in FIG. 1.
Figure 6:
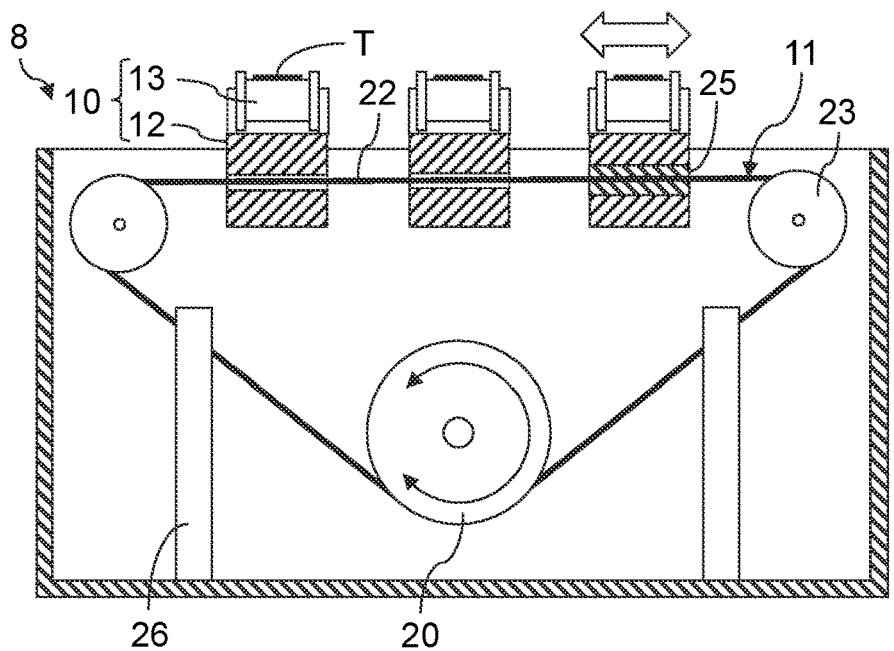
FIG. 6 is a sectional view at the position A-A of the tape feeder shown in FIG. 5.

FIG. 5 is a top view showing an example of concrete structure of each tape feeder 8 shown in FIG. 1, and FIG. 6 is a sectional view at the position A-A of the tape feeder 8 shown in FIG. 5.

Since the guide moving mechanism 11 is a mechanism for adjusting the intervals of the tape feeding guides 10, the guide moving mechanism 11 is composed of a device for relatively moving the tape feeding guides 10 in parallel. When the three tapes T are fed out by each tape feeder 8, the guide moving mechanism 11 can be composed of a simple power transmission mechanism as shown in FIG. 5 and FIG. 6. That is, the three tape feeding guides 10 can be relatively moved in parallel by a simple power transmission mechanism.

More specifically, the guide moving mechanism 11 can be composed of a driving roller 20, a motor 21, wires 22, pulleys 23, and a sliding mechanism 24, as exemplified by FIG. 5 and FIG. 6. The driving roller 20 rotates by the power from the motor 21. The torque output from the motor 21 can be transmitted to the rotating shaft of the driving roller 20 directly as illustrated but may be transmitted to the rotating shaft of the driving roller 20 indirectly through gears or a power transmission belt.

The driving roller 20 has outside diameters different from each other. The driving roller 20 has such structure that the driving roller 20 rotates around a common rotation axis. For example, the driving roller 20 may be a single roller rotating by a single rotation shaft and having portions whose outside diameters are different from each other. Alternatively, the driving roller 20 may include coaxially coupled sub rollers whose outside diameters are different from each other. The outside diameters of the driving roller 20 correspond to amounts of parallel movement of the tape feeding guides 10, respectively.

The number of the wires 22 is same as that of the tape feeding guides 10 which should be moved in parallel. Therefore, when the three tape feeding guides 10 are moved in parallel, the guide moving mechanism 11 has the three wires 22. Each wire 22 is in the form of a closed curved line. That is, each wire 22 forms a ring-shaped track having no ends.

Parts of the wires 22 are fixed to the portions of the driving roller 20 whose outside diameters are different from each other, respectively so that the wires 22 may be powered by the portions of the driving roller 20 whose outside diameters are different from each other, and moved in the length directions, respectively. Other parts of the wires 22 are coupled to the tape feeding guides 10, respectively. In the illustrated example, each wire 22 is fixed to one of the tape feeding guides 10, which is the coupling target, with a coupling tool while each wire 22 passes through holes formed in the other tape feeding guides 10, which are not coupling targets, in order to avoid interference of each wire 22 with the other tape feeding guides 10, which are not coupling targets.

The pulleys 23 are rollers for moving the wires 22 in the length directions while supporting the wires 22 coupled to the driving roller 20 and the tape feeding guides 10. In order to keep the tension of the wires 22 appropriately, tensioners 26 for adjusting the tension of the wires 22 may be included in the guide moving mechanism 11, as illustrated.

The sliding mechanism 24 slides the tape feeding guides 10 in the moving directions, respectively. In the illustrated example, the sliding mechanism 24 has two shafts 27 slidably inserted into through holes formed in the tape feeding guides 10.

The guide moving mechanism 11 having the structure as described above allows moving the tape feeding guides 10 in parallel by distances different from each other, respectively since the wires 22 supported with the pulleys 23 moves in the length directions by distances corresponding to the outside diameters of the driving roller 20 rotated by the motor 21.

Figure 7:
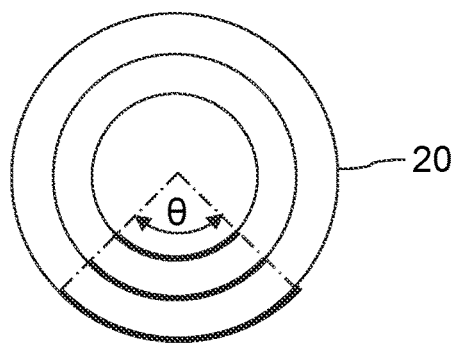
FIG. 7 is a view for explaining the principle for moving the wires by different distances respectively by the stepped driving roller shown in FIG. 5 and FIG. 6.

FIG. 7 is a view for explaining the principle for moving the wires 22 by different distances respectively by the stepped driving roller 20 shown in FIG. 5 and FIG. 6.

As shown in FIG. 7, the outer circumferential lengths of the portions of the driving roller 20 having the different outside diameters differ from each other even when the rotation angle θ of the driving roller 20 is the same. Therefore, the tape feeding guides 10 can be moved in parallel together with the wires 22 by distances equivalent to the different lengths of the arcs respectively only by powering and rotating the single driving roller 20. The distances by which the wires 22 move per one rotation of the driving roller 20 can be adjusted by adjusting the outside diameters of the driving roller 20 respectively.

The rotation angle of the driving roller 20 is controlled as the rotation quantity including a rotating direction of the motor 21. Accordingly, the rotation quantity of the motor 21 can be preset or numerically input to a control circuit of the motor 21 by a user. Thereby, the driving roller 20 can be rotated by a rotation angle specified by a user so that the tape feeding guides 10 may be moved in parallel by distances specified by the user respectively.

Note that, a handle or a lever may be attached to the driving roller 20 instead of the motor 21 so that a user can manually rotate the driving roller 20. In that case, a handle or a lever may be configured to be locked when the driving roller 20 rotated by specific rotation angles so that the driving roller 20 can be rotated by the rotation angles specified by a user.

Figure 8:
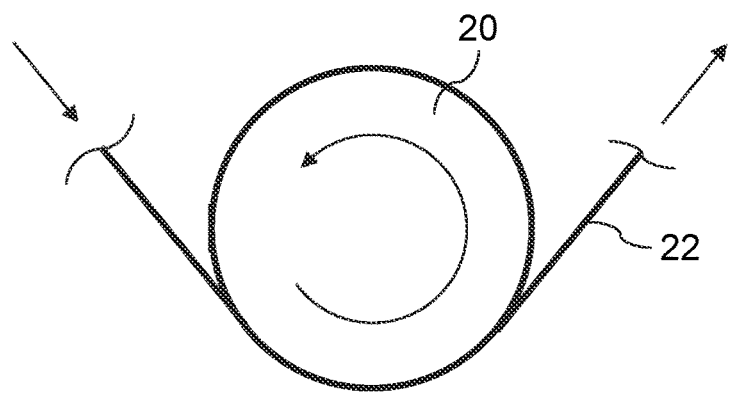
FIG. 8 is a view for explaining how to wind each wire shown in FIG. 5 and FIG. 6 to the driving roller.
Figure 9:
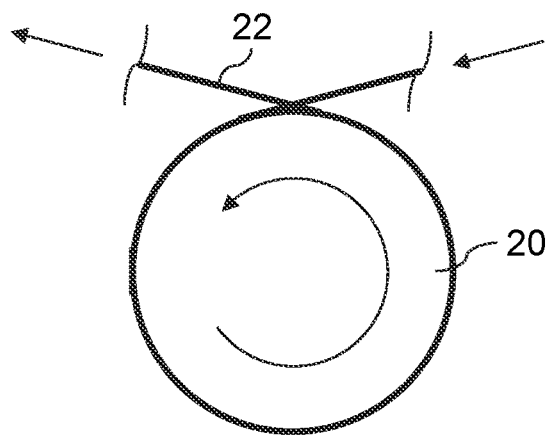
FIG. 9 is a view for explaining how to wind each wire shown in FIG. 5 and FIG. 6 to the driving roller.

Each of FIG. 8 and FIG. 9 is a view for explaining how to wind each wire 22 shown in FIG. 5 and FIG. 6 to the driving roller 20.

Each wire 22 is twisted around the driving roller 20, and a part of each wire 22 is fixed to the driving roller 20. Accordingly, the moving direction of each wire 22 can be determined by selecting a way to twist each wire 22 around the driving roller 20.

Specifically, when the wire 22 is twisted around the driving roller 20 so that the wire 22 may not intersect at any position where the wire 22 is away from the driving roller 20, as shown in FIG. 8, the moving direction of the ring wire 22 can be made counterclockwise in case of rotating the driving roller 20 counterclockwise. Conversely, when the wire 22 is twisted around the driving roller 20 so that the wire 22 may intersect at a position where the wire 22 is away from the driving roller 20, as shown in FIG. 9, the moving direction of the ring wire 22 can be made clockwise in case of rotating the driving roller 20 counterclockwise.

In the example shown in FIG. 5 and FIG. 6, the tape feeding guides 10 are disposed above the driving roller 20. Therefore, when the wire 22 is fed out on the lower side of the rotation axis of the driving roller 20 as shown in FIG. 8, the tape feeding guide 10 coupled to the wire 22 moves leftward in case of rotating the driving roller 20 counterclockwise. Conversely, when the wire 22 is fed out on the upper side of the rotation axis of the driving roller 20 as shown in FIG. 9, the tape feeding guide 10 coupled to the wire 22 moves rightward in case of rotating the driving roller 20 counterclockwise.

Thus, the sliding direction of each tape feeding guide 10 can be determined by the way to twist the wire 22 around the driving roller 20 while the distance by which each tape feeding guide 10 moves can be adjusted by adjusting the outside diameter of the driving roller 20. Accordingly, the intervals of the tape feeding guides 10 can be adjusted by rotation of the driving roller 20.

Figure 10:
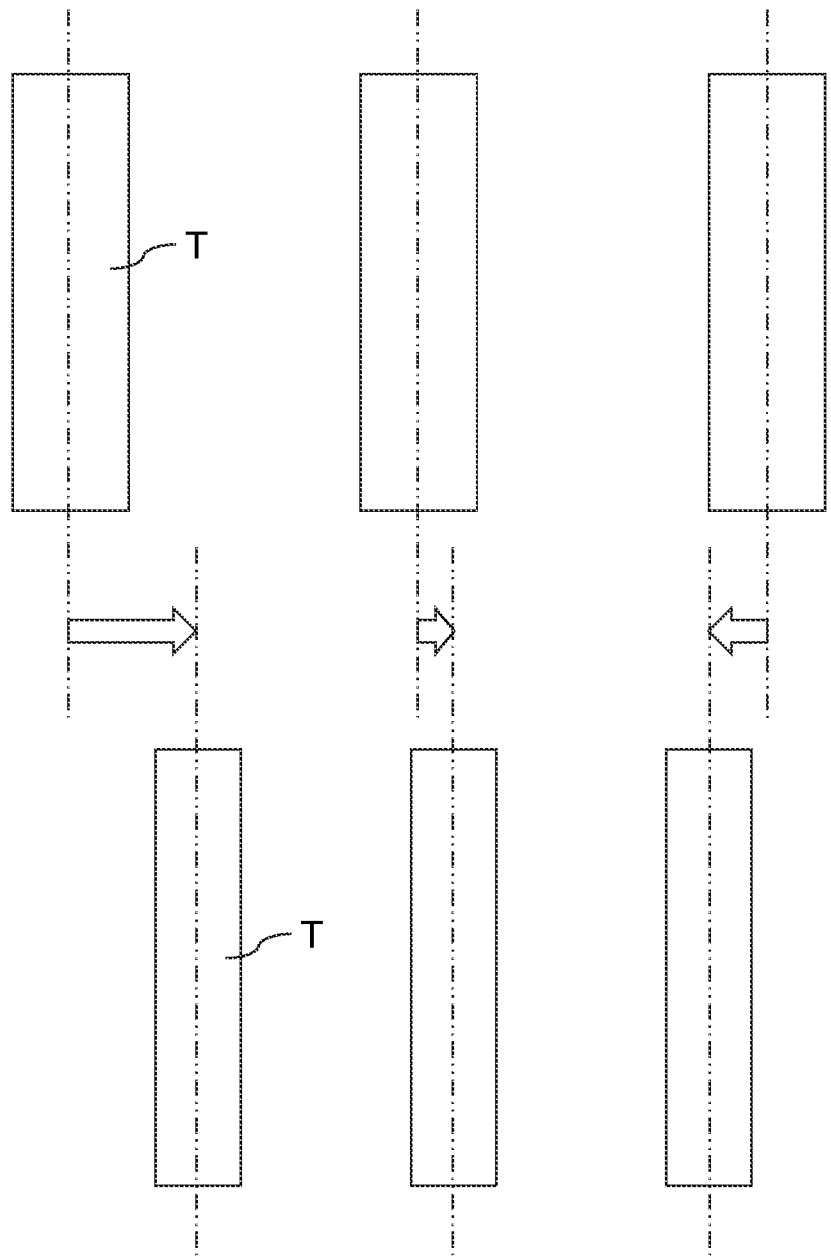
FIG. 10 shows an example of moving directions and moving amounts of the respective tape feeding guides in case of changing the intervals of the tape feeding guides, for feeding out the tapes having wide widths exemplified by FIG. 3, to the intervals of the tape feeding guides, for feeding out the tapes having narrow widths exemplified by FIG. 2.

FIG. 10 shows an example of moving directions and moving amounts of the respective tape feeding guides 10 in case of changing the intervals of the tape feeding guides 10, for feeding out the tapes T having wide widths exemplified by FIG. 3, to the intervals of the tape feeding guides 10, for feeding out the tapes T having narrow widths exemplified by FIG. 2.

When the three tapes T are fed out by the tape feeder 8 as shown in FIG. 5 and FIG. 6, the intervals of the three tape feeding guides 10 can be adjusted according to the width of the tape T so that the intervals of the three tape feeding guides 10 may become equal intervals. In this case, the central tape feeding guide 10 and one of the tape feeding guides 10 on both sides can be moved with appropriate moving amounts different from each other in a same direction while the other of the tape feeding guides 10 on both sides can be moved with an appropriate moving amount in the opposite direction. Thereby, the intervals of the three tape feeding guides 10 can be changed with keeping the intervals equal to each other.

In case of altering the intervals of the tape feeding guides 10 for feeding out the wide tapes T to the intervals of the tape feeding guides 10 for feeding out the narrow tapes T as shown in FIG. 10, the intervals of the three tape feeding guides 10 can be narrowed according to the widths of the tapes T with keeping the intervals equal to each other by sliding the central tape feeding guide 10 and the tape feeding guide 10 on the left side toward FIG. 5 and FIG. 6, rightward by appropriate distances indicated with the arrows in FIG. 10 respectively, and sliding the tape feeding guide 10 on the right side toward FIG. 5 and FIG. 6, leftward by an appropriate distance indicated with the arrow in FIG. 10. Meanwhile, the intervals of the three tape feeding guides 10 can be widened with keeping the intervals of the three tape feeding guides 10 equal to each other by similar sliding in the opposite direction.

This also applies to a case of altering the number of the tapes T disposed between each two spaced adjacent tapes T fed out from the same tape feeder 8, like a case of stopping a part of the tape feeders 8, and a case of newly adding the tape feeder 8.

Thus, in order to change the intervals of the tape feeding guides 10 with keeping the intervals of the tape feeding guides 10 equal to each other by rotating the driving roller 20, each of the ways to twist the wires 22 around the driving roller 20 can be determined to either one of the two ways shown in FIG. 8 and FIG. 9 according to the respective moving directions of the tape feeding guides 10 while the outside diameters of the driving roller 20 can be respectively determined according to moving distances of the tape feeding guides 10 and the wires 22 necessary for changing the intervals of the tape feeding guides 10 with keeping the intervals of the tape feeding guides 10 equal to each other.

As a matter of course, also when the intervals of the tape feeding guides 10 should be changed with keeping the intervals of the tape feeding guides 10 unequal to each other, like a case where the widths of the tapes T are different from each other among the tape feeders 8 or a case where the widths of the tapes T are different from each other in the same tape feeder 8, the outside diameters of the driving roller 20 can be determined according to corresponding moving distances of the tape feeding guides 10 respectively.

In the example shown in FIG. 5, the wire 22 fixed to the left tape feeding guide 10 is twisted by the way shown in FIG. 9 so that rotating the driving roller 20 counterclockwise can move the left tape feeding guide 10 rightward. Since the sliding distance of the left tape feeding guide 10 is the maximum among the three tape feeding guides 10, the wire 22 fixed to the left tape feeding guide 10 is twisted around the portion having the maximum outside diameter of the driving roller 20.

Meanwhile, the wire 22 fixed to the right tape feeding guide 10 is twisted by the way shown in FIG. 8 so that rotating the driving roller 20 counterclockwise can move the right tape feeding guide 10 leftward. Since the sliding distance of the right tape feeding guide 10 is the second longest among the three tape feeding guides 10, the wire 22 fixed to the right tape feeding guide 10 is twisted around the portion having the second largest outside diameter of the driving roller 20.

Further, the wire 22 fixed to the central tape feeding guide 10 is twisted by the way shown in FIG. 9 so that rotating the driving roller 20 counterclockwise can move the central tape feeding guide 10 rightward. Since the sliding distance of the central tape feeding guide 10 is the minimum among the three tape feeding guides 10, the wire 22 fixed to the central tape feeding guide 10 is twisted around the portion having the minimum outside diameter of the driving roller 20.

Although FIG. 5 and FIG. 6 show an example that the wires 22 are twisted around the driving roller 20, power transmission members, such as power transmission belts, each forming a track may be used instead of the wires 22. Alternatively, the tape feeding guides 10 may be respectively moved by chains, in the forms of closed curved lines, moved by coaxially disposed sprockets having outside diameters different from each other, instead of the driving roller 20.

That is, the structure of the guide moving mechanism 11 can be simplified by adopting, as the guide moving mechanism 11, a mechanism that at least one rotating body, such as the driving roller 20 or sprockets, having portions whose outside diameters are different from each other and rotation axes lie on a same straight line is rotated to move power transmission members, such as the wires 22, power transmission belts or chains, in the forms of closed curved lines by mutually different moving amounts corresponding to the mutually different outside diameters of the at least one rotating body respectively. When power transmission members, such as power transmission belts or chains, whose moving directions cannot be changed easily by selecting twisting ways unlike the wires 22 are used, at least one rotating direction of a part of rotating bodies may be changed by gears or the like.

As other examples, the guide moving mechanism 11 may be composed of desired machine elements, such as ball screws, sets of rack-and-pinion, or cylinder mechanisms each having a cylinder tube and a piston reciprocated in the cylinder tube, for moving objects linearly.

(A Method of Arranging Fibers and a Method of Molding a Composite Material)

Next, a method of arranging fibers and a method of molding a composite material using the fiber arranging device 1 and the AFP apparatus 4 will be described.

Figure 11:
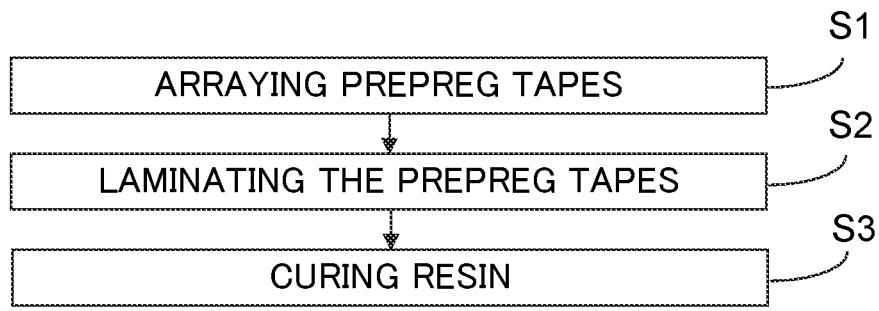
FIG. 11 is a flow chart showing an example of a flow for molding an FRP with material consisting of prepreg tapes using the fiber arranging device and the AFP apparatus shown in FIG. 1.

FIG. 11 is a flow chart showing an example of a flow for molding an FRP with material consisting of prepreg tapes using the fiber arranging device 1 and the AFP apparatus 4 shown in FIG. 1.

First, in step S1, the tapes T consisting of prepreg tapes supplied from mutually different directions are arrayed by the fiber arranging device 1. Specifically, the tape T supplied from the bobbins 2 are supplied from mutually different directions to the fiber arranging device 1 as exemplified by FIG. 1. The widths of the tapes T to be supplied to the fiber arranging device 1 may be changed to desired widths by the width adjusting devices 3 respectively, as needed.

The tapes T fed from mutually different directions into the fiber arranging device 1 are fed into the corresponding tape feeders 8 respectively. The tape feeding guides 10 included in each of the tape feeder 8 are previously positioned so as to have the intervals according to the widths of the tapes T by driving the guide moving mechanism 11. More specifically, the tape feeding guides 10 are positioned by the guide moving mechanism 11 so that the tapes T fed out from one of the tape feeders 8 may have intervals in which the tapes T fed out from the other tape feeders 8 can be disposed without overlapping the tapes T with each other.

Accordingly, the tapes T of which the intervals are regulated by the tape feeding guides 10 are fed out from each tape feeder 8. The tapes T fed out from the tape feeders 8 are gathered to the assembling roller 9. On the assembling roller 9, the tapes T fed out from the different tape feeders 8 are disposed alternately, and all the tapes T gathered on the assembling roller 9 are fed out in a same feeding direction. Thereby, the arrayed tapes T can be produced as material of an FRP.

Next, in step S2, the arrayed tapes T are laminated. For that purpose, the tapes T arrayed by the fiber arranging device 1 are supplied to the AFP apparatus 4. Then, the arrayed tapes T are laminated by the AFP apparatus 4.

When the AFP apparatus 4 is configured to move the compaction roller 6 relatively to the table 5 by the moving mechanism 7 as shown in FIG. 1, for example, the tapes T supplied to the AFP apparatus 4 are pushed on the table 5 side by the compaction roller 6 moved relatively to the table 5 by driving the moving mechanism 7. Thereby, the tapes T pushed on the table 5 side by the compaction roller 6 are fed out in the direction opposite to the moving direction of the compaction roller 6.

The tapes T fed out toward the table 5 first are laid on the table 5 directly or on a lamination jig J, such as a mold, placed on the table 5. The tapes T fed out toward the table 5 afterward are subsequently laminated on the tapes T adjacent on the lower side. When all the tapes T have been laminated, a laminated body of the tapes T consisting of prepreg tapes is obtained. That is, a laminated body of the arrayed tapes T produced by the fiber arranging device 1 can be produced by the AFP apparatus 4.

Note that, the arrayed tapes T simultaneously fed out from the AFP apparatus 4 do not overlap with each other in the width direction. Therefore, the tack force of prepreg does not act between each adjacent tapes T. Accordingly, it is possible to feed out each tape T with independent feeding rate and length different from those of another tape T. As a result, even when the compaction roller 6 is moved along a curved line, the tapes T can be fed out without slack, excess tension, and the like in the tapes T. Thereby, it is possible to produce a laminated body of the tapes T having a complicated form.

Next, in step S3, the resin included in the laminated body of the tapes T is cured. Thereby, an FRP can be molded. That is, an FRP referred to as a composite material can be molded using the laminated body of the tapes T produced by the AFP apparatus 4.

In case of thermosetting resin, the resin can be cured by heating the resin with a heater, such as an autoclave apparatus or an oven. Meanwhile, in case of thermoplastic resin, the resin can be cured by air cooling of the resin molten by previously heating the resin, or cooling of the heated molten resin with a cooling system.

When the resin is cured, the laminated body of the tapes T may be transferred from the lamination jig J onto a molding jig, or the common jig J may be used for curing the resin. Usually, curing the resin requires pressurization of the laminated body of the tapes T from above. Accordingly, the laminated body of the tapes T may be pressurized by an upper mold. Alternatively, the atmospheric pressure may be applied on the laminated body of the tapes T by bagging with vacuuming. A device or devices, such as an upper mold, a vacuum device, a heater or a cooling system, required for molding an FRP may be integrated with the AFP apparatus 4.

Figure 12:
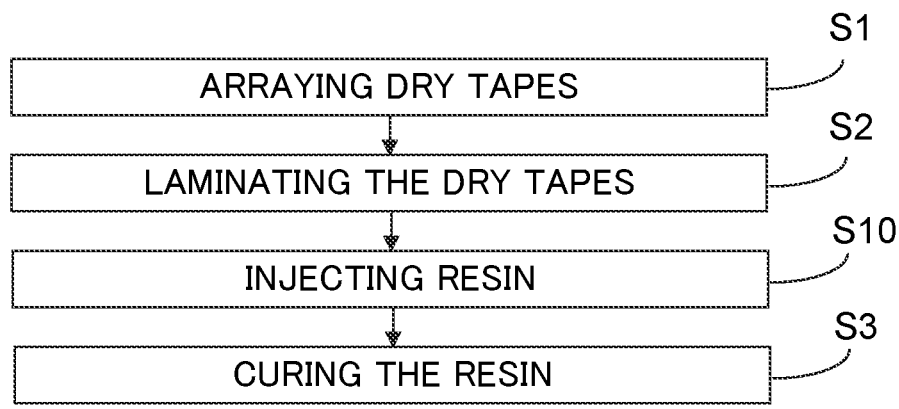
FIG. 12 is a flow chart showing an example of a flow for molding an FRP with material consisting of dry tapes using the fiber arranging device and the AFP apparatus shown in FIG. 1.

FIG. 12 is a flow chart showing an example of a flow for molding an FRP with material consisting of dry tapes using the fiber arranging device 1 and the AFP apparatus 4 shown in FIG. 1. In FIG. 12, the same signs are attached to steps similar to those in FIG. 11 except for whether the tapes T are dry tapes or prepreg tapes, and detailed explanation thereof is omitted.

Dry tapes may also be arrayed by the fiber arranging device 1, and then the arrayed dry tapes may be laminated by the AFP apparatus 4 or another dedicated lamination apparatus. In that case, a laminated body of the tapes T consisting of the dry tapes is obtained in step S2. Accordingly, in step S10, resin is injected into the laminated body of the tapes T. For that purpose, the laminated body of the tapes T is sealed by a mold or bagging with vacuuming. After that, an FRP is molded by curing the resin with which the laminated body of the tapes T has been impregnated, in step S3.

(Effects)

As described above, the fiber arranging device 1, the method of arranging fibers and the method of molding a composite material array the tapes T consisting of prepreg tapes or dry tapes without overlapping the tapes T with each other by alternately disposing the sets of the tapes T fed out with adjustable intervals.

Therefore, the fiber arranging device 1, the method of arranging fibers and the method of molding a composite material allow laminating many tapes simultaneously. In addition, the feeding speeds and feeding lengths of the tapes T may differ from each other among the tapes T. Accordingly, the tapes T can be laminated along a curved line without excess tension and slack of the tapes T. As a result, an FRP having a more complicated form can be molded.

In particular, the intervals of the tapes T to be disposed alternately can be changed. Therefore, even when an FRP is molded using the tapes T having widths different from each other, an excess gap and a non-negligible lap between each tapes T adjacent to each other can be prevented from arising. In other words, the tapes T having unspecified widths can be laminated with high quality.

As a result, the total width of the laminated tapes T can be changed. In addition, in case of feeding out the tapes T along a curved line having a large curvature, the narrow tapes T can be used for securing the quality. Meanwhile, in case of feeding out the tapes T along a straight line or a curved line having a small curvature, the wide tapes T can be used for improving the lamination efficiency. That is, the tapes T having appropriate widths according to the form of an FRP can be used as material.

Furthermore, it is not necessary to feed out the tapes T alternately from the AFP apparatus 4 since the tapes T fed out from the AFP apparatus 4 have been already arrayed by the fiber arranging device 1, and thereby there is no interference between mechanisms for feeding out the tapes T in the AFP apparatus 4. That is, the tapes T can be fed out simultaneously while applying pressure on the tapes T by the common and single compaction roller 6 without preparing a compaction roller per tape T.

Accordingly, even when many tapes T are fed out, the structure of the lamination head of the AFP apparatus 4 can be made simple and compact. In other words, more tapes T can be laminated simultaneously without making the structure of the lamination head of the AFP apparatus 4 complicated and large-scale.

Moreover, even when at least one of the widths and the number of the tapes T is altered, it is not necessary to slide the lamination head of the AFP apparatus 4 in the width direction of the tapes T since the AFP apparatus 4 is not required to include lamination heads having compaction rollers corresponding to the tapes T. Accordingly, it is possible to easily change not only the widths of the tapes T to be fed out from the AFP apparatus 4 but the number of the tapes T. In other words, it is unnecessary to prepare lamination heads, having complicated mechanisms for feeding out the tapes T with changing the widths and the number of the tapes T, in the AFP apparatus 4.

(Second Implementation)

Figure 13:
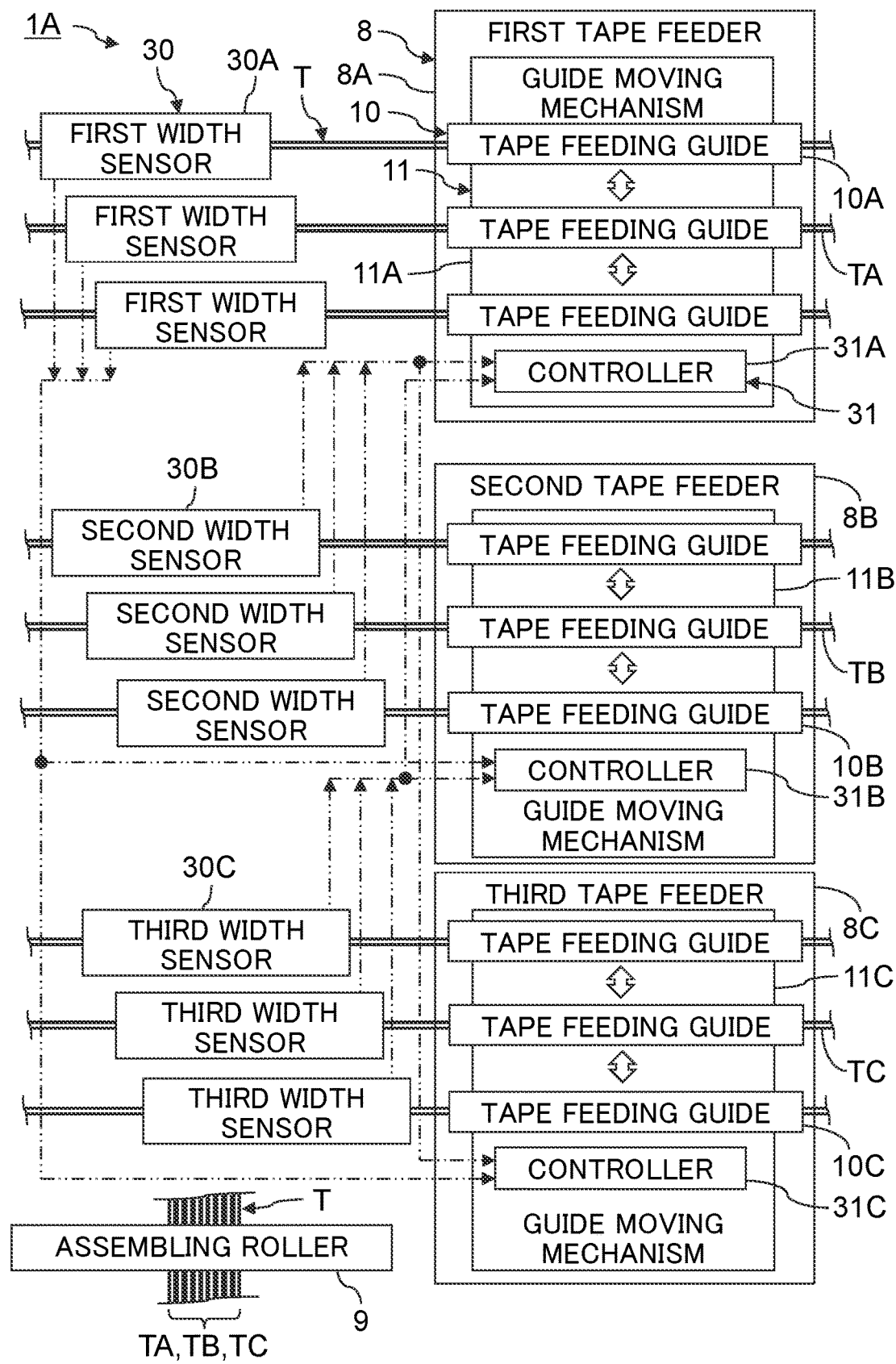
FIG. 13 is a diagram showing configuration of a fiber arranging device according to the second implementation of the present invention.

FIG. 13 is a diagram showing configuration of a fiber arranging device according to the second implementation of the present invention.

A fiber arranging device 1A in the second implementation shown in FIG. 13 is different from the fiber arranging device 1 in the first implementation in the feature that the intervals of the tape feeding guides 10 can be automatically adjusted in real time based on the widths of the tapes T measured by width sensors 30 during feeding out the tapes T. Other configuration and actions of the fiber arranging device 1A in the second implementation are not substantially different from those of the fiber arranging device 1 in the first implementation. Accordingly, only the main elements of the fiber arranging device 1A are illustrated in a block diagram, and the same signs are attached to the same elements and the corresponding elements while explanation thereof is omitted.

In the fiber arranging device 1A in the second implementation, each of the tape feeders 8 includes the width sensors 30 for detecting the widths of the tapes T. Therefore, each of the tape feeders 8 includes the width sensors 30 whose number is equal to the number of the tapes T, and thereby the fiber arranging device 1A includes the width sensors 30 whose number is equal to the total number of the tapes T to be arrayed. For example, in case of feeding out the three tapes TA, TB, or TC from each of the first to the third tape feeders 8A, 8B, and 8C as exemplified by FIG. 1 and FIG. 2, the number of the width sensors 30 is nine.

A desired known sensor can be used as each of the width sensors 30. Examples of the non-contact width sensor 30 for measuring the width of the tape T include a sensor using at least one reflective laser displacement sensor and a sensor using at least one transmissive laser displacement sensor. Alternatively, the tape T may be photographed by an image sensor, and the width of the tape T may be detected by image processing.

In case of utilizing at least one reflective laser displacement sensor, the two edges on both sides of the tape T can be detected by measuring displacement in the thickness direction of the tape T using a single reflective laser displacement sensor or a pair of reflective laser displacement sensors, which oscillate a belt-like laser beam or belt-like laser beams crossing the edges on both sides of the tape T. In this case, the distance between the edges can be detected as the width. Meanwhile, in case of utilizing at least one transmissive laser displacement sensor, a single laser oscillator or a pair of laser oscillators, which oscillate a belt-like laser beam or belt-like laser beams crossing the edges on both sides of the tape T, and a single laser photodetector or a pair of laser photodetectors, which detect the laser beam oscillated by the single laser oscillator or the laser beams oscillated by the pair of the laser oscillators can be disposed so that the tape T may be interposed. In this case, a range within which the laser beam or the laser beams are not detected with the single laser photodetector or the pair of the laser photodetectors due to interruption of the laser beam or the laser beams by the tape T can be detected as the width.

The widths of the tapes T measured by the width sensors 30 included in each tape feeder 8 are output to each of controllers 31 of the guide moving mechanisms 11 included in all the other tape feeders 8. Each of the controllers 31 of the guide moving mechanisms 11 is configured to control the intervals of the tape feeding guides 10 controlled by the corresponding guide moving mechanism 11, based on the widths of the tapes T measured by the width sensors 30 included in all the other tape feeders 8. Specifically, each controller 31 controls the guide moving mechanism 11 so that the intervals of the tape feeding guides 10 may become appropriate intervals corresponding to the widths of the tapes T fed out from the other tape feeders 8.

In case of feeding out the three tapes TA, TB, or TC from each of the first to the third tape feeders 8A, 8B, and 8C as exemplified by FIGS. 1 and 2, and FIG. 13, for example, the widths of the first tapes TA measured by the first width sensors 30A included in the first tape feeder 8A are output to each of the second controller 31B of the second guide moving mechanism 11B included in the second tape feeder 8B and the third controller 31C of the third guide moving mechanism 11C included in the third tape feeder 8C.

Similarly, the widths of the second tapes TB measured by the second width sensors 30B included in the second tape feeder 8B are output to each of the first controller 31A of the first guide moving mechanism 11A included in the first tape feeder 8A and the third controller 31C of the third guide moving mechanism 11C included in the third tape feeder 8C while the widths of the third tapes TC measured by the third width sensors 30C included in the third tape feeder 8C are output to each of the first controller 31A of the first guide moving mechanism 11A included in the first tape feeder 8A and the second controller 31B of the second guide moving mechanism 11B included in the second tape feeder 8B.

Then, the first controller 31A of the first guide moving mechanism 11A included in the first tape feeder 8A controls the intervals of the first tape feeding guides 10A based on the widths of the second tapes TB measured by the second width sensors 30B included in the second tape feeder 8B and the widths of the third tapes TC measured by the third width sensors 30C included in the third tape feeder 8C so that the intervals of the first tape feeding guides 10A may become appropriate intervals corresponding to the widths of the second tapes TB fed out from the second tape feeder 8B and the widths of the third tapes TC fed out from the third tape feeder 8C, more specifically, so that the intervals of the first tape feeding guides 10A may become intervals which allows disposing the second tapes TB fed out from the second tape feeder 8B and the third tapes TC fed out from the third tape feeder 8C without overlapping the first to third tapes TA, TB and TC with each other.

Similarly, the second controller 31B of the second guide moving mechanism 11B included in the second tape feeder 8B controls the intervals of the second tape feeding guides 10B based on the widths of the first tapes TA measured by the first width sensors 30A included in the first tape feeder 8A and the widths of the third tapes TC measured by the third width sensors 30C included in the third tape feeder 8C so that the intervals of the second tape feeding guides 10B may become appropriate intervals corresponding to the widths of the first tapes TA fed out from the first tape feeder 8A and the widths of the third tapes TC fed out from the third tape feeder 8C, more specifically, so that the intervals of the second tape feeding guides 10B may become intervals which allows disposing the first tapes TA fed out from the first tape feeder 8A and the third tapes TC fed out from the third tape feeder 8C without overlapping the first to third tapes TA, TB and TC with each other. It is similar for the third controller 31C of the third guide moving mechanism 11C included in the third tape feeder 8C.

When the guide moving mechanism 11 is driven by the motor 21 as exemplified by FIG. 5 and FIG. 6, the motor 21 is the controlled target by the controller 31. Therefore, the intervals of the tape feeding guides 10 are controlled by outputting a control command signal of the rotation amount of the motor 21, corresponding to the intervals of the tape feeding guides 10, from the controller 31 to the motor 21.

Controlling the intervals of the tape feeding guides 10 according to the widths of the tapes T actually measured by the width sensors 30 as described above allows changing the intervals of the tape feeding guides 10 while following the widths of the tapes T even when the widths of the tapes T change during feeding of the tapes T. Accordingly, the tapes T can be supplied to the fiber arranging device 1A while changing the widths of the tapes T during feeding of the tapes T.

Figure 14:
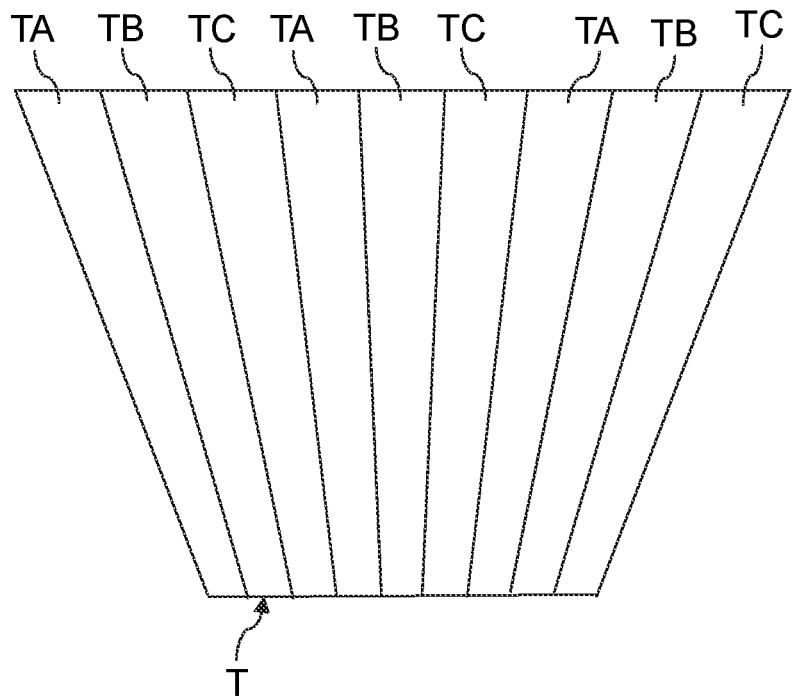
FIG. 14 is a top view showing an example of forms of the tapes which can be arrayed by the fiber arranging device shown in FIG. 13.

FIG. 14 is a top view showing an example of forms of the tapes T which can be arrayed by the fiber arranging device 1A shown in FIG. 13.

The tapes T supplied to the fiber arranging device 1A while changing the widths with a constant amount of change per unit time has a trapezoidal form overall as shown in FIG. 14. That is, the total width of the arrayed tapes T can be changed by arraying the tapes T, each having a non-constant width, by the fiber arranging device 1A. As a matter of course, the tapes T may be supplied to the fiber arranging device 1A while changing the widths with a non-constant amount of change per unit time. In that case, the overall shape formed by the arrayed tapes T can be made more complicated.

When the tapes T are supplied to the fiber arranging device 1A while changing the widths, it is necessary to dispose the width adjusting devices 3 in the front stage of the fiber arranging device 1A as shown in FIG. 1. In addition, it is also necessary to control not only the intervals of the tape feeding guides 10 but the width adjusting devices 3 in real time during feeding of the tapes T. Accordingly, feedback control may be performed based on the widths of the tapes T measured by the width sensors 30 so that the widths of the tapes T fed out from the corresponding width adjusting devices 3 may become target widths respectively.

Figure 15:
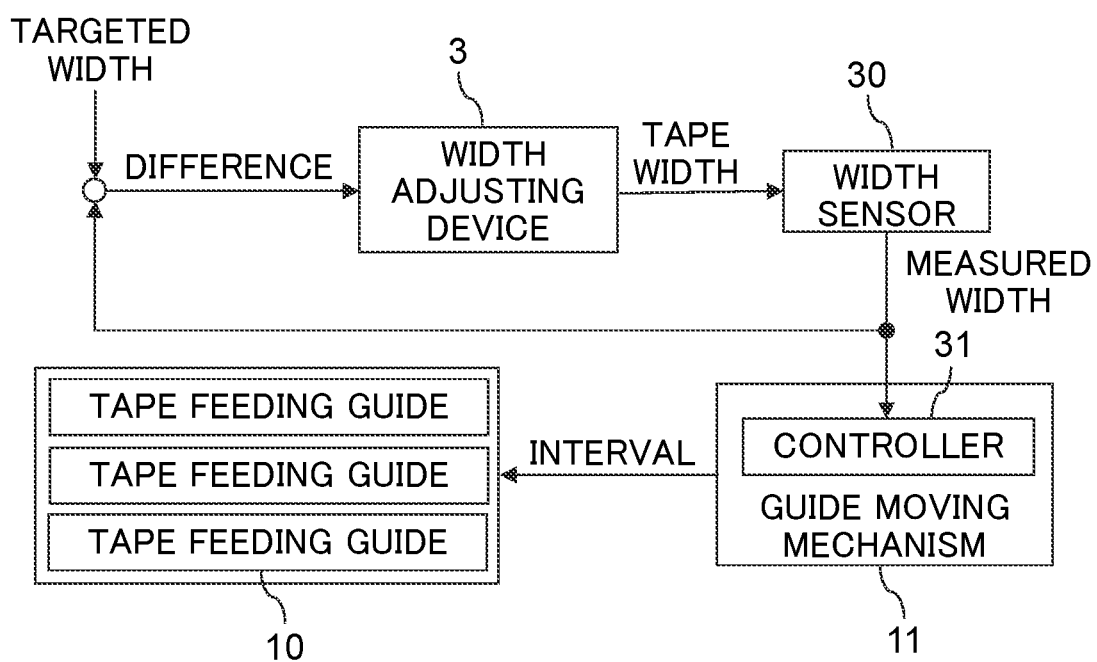
FIG. 15 shows an example of a control block diagram for feedback control of the width adjusting devices based on the widths of the tapes measured by the width sensors shown in FIG. 13.

FIG. 15 shows an example of a control block diagram for feedback control of the width adjusting devices 3 based on the widths of the tapes T measured by the width sensors 30 shown in FIG. 13.

As shown in FIG. 15, the width of the tape T adjusted by the width adjusting device 3 is measured by the width sensor 30. The width of the tape T measured by the width sensor 30 is output to the controller 31 of the corresponding guide moving mechanism 11 in order to control the intervals of the corresponding tape feeding guides 10B.

In addition, the width of the tape T measured by the width sensor 30 can be also output to the corresponding width adjusting device 3. Then, feedback control of the width adjusting device 3 can be performed so that the differences between target values of the width of the tape T given to the width adjusting device 3 as time series control-command values and the actual measured values of the width of the tape T measured by the width sensor 30 may approach zero.

Although FIG. 15 shows the control block diagram focusing on one width adjusting device 3, the width adjusting devices 3 whose number is the same as the number of the tapes T can be integrally controlled. Therefore, feedback control of the width adjusting devices 3 can be performed by setting a total width of the arrayed tapes T as a target value.

When the variation in the width among the tapes T fed out by the same tape feeder 8 is negligible, only the width of one tape T or the widths of a part of tapes T, out of the tapes T fed out by the same tape feeder 8, may be measured by at least one width sensor 30 as representative value or representative values. In this case, each width of the tape T which was not measured by the width sensor 30 may be considered as the representative value or an estimate value based on the representative values.

According to the above-mentioned second implementation, an effect that the tapes T can be fed out while changing the total width of the arrayed tapes T can be attained in addition to the effects similar to those in the first implementation. Accordingly, it becomes possible to mold an FRP having a more complicated form.

Note that, the tapes T can be fed out while changing the total width of the arrayed tapes T also in the first implementation by controlling the guide moving mechanisms 11 with a prepared control program, in which the amounts of change of the intervals of the tape feeding guides 10 have been defined based on the amounts of change of the widths of the tapes T to be supplied, i.e., a control program for defining time series positions of the tape feeding guides 10. Nevertheless, controlling the guide moving mechanisms 11 based on the widths of the tapes T measured by the width sensors 30 like the second implementation can make it unnecessary not only to create a control program for every form of FRP but to prepare a complicated control program itself.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A fiber arranging device comprising:
   first guides for guiding a first feeding of first tapes in a first feeding direction, the first tapes being first fibers or prepregs;
   a first moving mechanism configured to change an interval between the first guides, for the first feeding of the first tapes with a first interval, the first moving mechanism having at least one of first tracks, first ball screws, first sets of rack-and-pinion, and first cylinder mechanisms each having a cylinder tube and a piston reciprocated in the cylinder tube;
   second guides for guiding a second feeding of second tapes in a second feeding direction, the second tapes being second fibers or prepregs, the second feeding direction differing from the first feeding direction;
   a second moving mechanism configured to change an interval between the second guides, for the second feeding of the second tapes with a second interval, the second moving mechanism having at least one of second tracks, second ball screws, second sets of rack-and-pinion, and second cylinder mechanisms each having a cylinder tube and a piston reciprocated in the cylinder tube; and
   a roller for feeding, in a same feeding direction, the first tapes fed with the first interval from the first guides and the second tapes fed with the second interval from the second guides, the roller disposing the first tapes and the second tapes alternately, and further comprising:
   a first sensor for detecting at least one first width of the first tapes; and
   a second sensor for detecting at least one second width of the second tapes,
   wherein the first moving mechanism is configured to control the interval between the first guides based on the at least one second width of the second tapes detected by the second sensor, and
      the second moving mechanism is configured to control the interval between the second guides based on the at least one first width of the first tapes detected by the first sensor.

2. The fiber arranging device according to claim 1,
   wherein the first moving mechanism includes:
   at least one rotating body having portions of which outer diameters are different from each other, the at least one rotating body rotating around a common rotation axis; and
   the first tracks, having at least one of wires, power transmission belts and chains, for respectively moving the first guides by moving amounts different from each other, the moving amounts corresponding to the outer diameters, the first tracks each having a closed curved line shape, the first tracks moving in length directions by receiving power from the portions of the at least one rotating body respectively, the first tracks being singly coupled to the first guides.

3. A method of arranging fibers comprising:
   producing arrayed tapes by the fiber arranging device according to claim 1, the arrayed tapes including the first tapes having the first interval and the second tapes having the second interval, the arrayed tapes having no adjacent tapes overlapped with each other in a width direction.

4. A method of molding a composite material comprising:
   producing a laminated body of the arrayed tapes by laminating the arrayed tapes produced by the method according to claim 3; and
   molding the composite material using the laminated body.

5. A fiber arranging device comprising:
   first guides for guiding a first feeding of first tapes in a first feeding direction, the first tapes being first fibers or prepregs;
   a first moving mechanism configured to change an interval between the first guides, for the first feeding of the first tapes with a first interval, the first moving mechanism having at least one of first tracks, first ball screws, first sets of rack-and-pinion, and first cylinder mechanisms each having a cylinder tube and a piston reciprocated in the cylinder tube;
   second guides for guiding a second feeding of second tapes in a second feeding direction, the second tapes being second fibers or prepregs, the second feeding direction differing from the first feeding direction;
   a second moving mechanism configured to change an interval between the second guides, for the second feeding of the second tapes with a second interval, the second moving mechanism having at least one of second tracks, second ball screws, second sets of rack-and-pinion, and second cylinder mechanisms each having a cylinder tube and a piston reciprocated in the cylinder tube; and
   a roller for feeding, in a same feeding direction, the first tapes fed with the first interval from the first guides and the second tapes fed with the second interval from the second guides, the roller disposing the first tapes and the second tapes alternately, and
   wherein the first moving mechanism includes:
   at least one rotating body having portions of which outer diameters are different from each other, the at least one rotating body rotating around a common rotation axis; and
   the first tracks, having at least one of wires, power transmission belts and chains, for respectively moving the first guides by moving amounts different from each other, the moving amounts corresponding to the outer diameters, the first tracks each having a closed curved line shape, the first tracks moving in length directions by receiving power from the portions of the at least one rotating body respectively, the first tracks being singly coupled to the first guides.

6. A method of arranging fibers comprising:
   producing arrayed tapes by the fiber arranging device according to claim 5, the arrayed tapes including the first tapes having the first interval and the second tapes having the second interval, the arrayed tapes having no adjacent tapes overlapped with each other in a width direction.

7. A method of molding a composite material comprising:
producing a laminated body of the arrayed tapes by laminating the arrayed tapes produced by the method according to claim 6; and
molding the composite material using the laminated body.

8. A method of arranging fibers comprising:
producing arrayed tapes by the fiber arranging device according to claim 2, the arrayed tapes including the first tapes having the first interval and the second tapes having the second interval, the arrayed tapes having no adjacent tapes overlapped with each other in a width direction.

9. A method of molding a composite material comprising:
producing a laminated body of the arrayed tapes by laminating the arrayed tapes produced by the method according to claim 8; and
molding the composite material using the laminated body.

* * * * *